(12) United States Patent
Nakhasi et al.

(10) Patent No.: US 9,332,774 B2
(45) Date of Patent: May 10, 2016

(54) MICROENCAPSULATED OIL PRODUCT AND METHOD OF MAKING SAME

(75) Inventors: Dilip K. Nakhasi, Bourbonnais, IL (US); Roger L. Daniels, Manhattan, IL (US); Danielle N. Corbin, Richton Park, IL (US); Richard C. Green, Saskatoon (CA)

(73) Assignee: Bunge Oils, Inc., St. Louis, MO (US)

( * ) Notice: Subject to any disclaimer, the term of this patent is extended or adjusted under 35 U.S.C. 154(b) by 1143 days.

(21) Appl. No.: 11/769,224

(22) Filed: Jun. 27, 2007

(65) Prior Publication Data

US 2009/0004333 A1  Jan. 1, 2009

(51) Int. Cl.

| | |
|---|---|
| A23L 1/30 | (2006.01) |
| A23L 1/164 | (2006.01) |
| A21D 2/16 | (2006.01) |
| A21D 2/26 | (2006.01) |
| A23L 1/00 | (2006.01) |
| A23L 1/0522 | (2006.01) |
| A23L 1/053 | (2006.01) |
| A23L 1/0532 | (2006.01) |
| A23L 2/52 | (2006.01) |

(52) U.S. Cl.
CPC .............. *A23L 1/1643* (2013.01); *A21D 2/165* (2013.01); *A21D 2/263* (2013.01); *A21D 2/266* (2013.01); *A23L 1/0032* (2013.01); *A23L 1/053* (2013.01); *A23L 1/0522* (2013.01); *A23L 1/0532* (2013.01); *A23L 1/05226* (2013.01); *A23L 1/3006* (2013.01); *A23L 2/52* (2013.01); *A23V 2002/00* (2013.01)

(58) Field of Classification Search
USPC ................ 426/72, 89, 573, 658, 601
See application file for complete search history.

(56) References Cited

U.S. PATENT DOCUMENTS

| 2,800,457 A | 7/1957 | Green et al. |
|---|---|---|
| 2,876,160 A | 3/1959 | Schoch et al. |
| 3,786,123 A | 1/1974 | Katzen |
| 4,022,917 A | 5/1977 | Selenke |
| 4,217,370 A | 8/1980 | Rawlings et al. |
| 4,469,710 A | 9/1984 | Rielley et al. |
| 4,908,233 A | 3/1990 | Takizawa et al. |

(Continued)

FOREIGN PATENT DOCUMENTS

| DE | 10028621 | 12/2001 |
|---|---|---|
| WO | WO 97/48288 | 12/1997 |
| WO | 2004/006896 A1 | 1/2004 |

OTHER PUBLICATIONS

Food Products Formulary, p. 35, vol. 4, Fabricated Foods, The Avi Publishing Company, Inc., Westport, CT, 1982.

(Continued)

*Primary Examiner* — D. Lawrence Tarazano
*Assistant Examiner* — Katherine D LeBlanc
(74) *Attorney, Agent, or Firm* — Jones Day

(57) ABSTRACT

A microencapsulated product comprises a core, a first shell comprising a protein and being substantially carbohydrate-free, and a second shell comprising a carbohydrate and being substantially protein-free. The double shell structure provides a strong shell that makes the microcapsule suitable for use in food products. The core can be a lipid, and in particular a structured lipid with nutritional benefits, such that the nutritional benefits can be passed on to the consumer. The microcapsules of the present invention can be used in making foods products, beverage products, and mixes for making such food and beverage products.

37 Claims, 5 Drawing Sheets

(56) References Cited

U.S. PATENT DOCUMENTS

| | | | |
|---|---|---|---|
| 4,921,705 A | 5/1990 | Arai et al. |
| 5,051,304 A | 9/1991 | David et al. |
| 5,456,985 A | 10/1995 | Zgoulli et al. |
| 5,601,760 A | 2/1997 | Rosenberg |
| 5,676,994 A | 10/1997 | Eskins et al. |
| 6,149,953 A | 11/2000 | Redding, Jr. |
| 6,261,613 B1 | 7/2001 | Narayanaswamy et al. |
| 6,475,542 B1 | 11/2002 | Soeda et al. |
| 6,500,463 B1 | 12/2002 | Van Lengerich |
| 6,592,916 B2 | 7/2003 | Soeda et al. |
| 6,863,917 B2 | 3/2005 | Redding, Jr. et al. |
| 6,969,530 B1 | 11/2005 | Curtis et al. |
| 6,974,592 B2 | 12/2005 | Yan |
| 2002/0034549 A1 | 3/2002 | Becker et al. |
| 2004/0017017 A1 | 1/2004 | Van Lengerich et al. |
| 2004/0169298 A1 | 9/2004 | Fukasawa et al. |
| 2005/0067726 A1 | 3/2005 | Yan et al. |
| 2005/0084586 A1 | 4/2005 | Redding et al. |
| 2005/0196512 A1 | 9/2005 | Nakhasi et al. |

OTHER PUBLICATIONS

Troeng, Sixten, "Oil Determination of Oilseed. Gravimetric Routine Method", The Journal of the American Chemists' Society, 1954, pp. 124-126, vol. 39.

Regenstein, Joe M. and Regenstein, Carrie E., "Protein Functionality for Food Scientists", Food Protein Chemistry, An Introduction for Food Scientists, 1984, pp. 290-291, Academic Press, Inc.

Jackson, Lauren S. and Lee, Ken, "Microencapsulation and the Food Industry", Food Science & Technology, 1991, pp. 289-297, vol. 24, No. 4, Academic Press, Inc.

Young, S.L., Sarda, X. and Rosenberg, M., "Microencapsulating Properties of Whey Proteins. Microencapsulation of Anhydrous Milk Fat", Journal of Dairy Science, 1993, pp. 2868-2877, vol. 76, No. 10.

Ijichi, Kazuya, et al., "Multi-Layered Gelatin/Acacia Microcapsules by Complex Coacervation Method", Journal of Chemical Engineering of Japan, 1997, pp. 793-798, vol. 30, No. 5.

McNamee, Brian F., et al., "Emulsification and Microencapsulation Properties of Gum Arabic", J. Agric. Food Chem., 1998, pp. 4551-4555, vol. 46, No. 11, American Chemical Society.

Hogan, Sean A., et al., "Microencapsulating Properties of Sodium Caseinate", J. Agric. Food Chem., 2001, pp. 1934-1938, vol. 49, American Chemical Society.

Gouin, Sebastien, "Microencapsulation: Industrial Appraisal of Existing Technologies and Trends", Trends in Food Science & Technology, 2004, pp. 330-347, vol. 15, Elsevier Ltd.

Ducel, V., et al., "Evidence and Characterization of Complex Coacervates Containing Plant Proteins: Application to the Microencapsulation of Oil Droplets", Colloids and Surfaces A: Eng. Aspects, 2003, pp. 239-247, Elsevier Ltd.

Lazko, J., et al., "Soy Glycinin Microcapsules by Simple Coacervation Method", Colloids and Surfaces B: Biointerfaces, 2004, pp. 1-8, Elsevier B.V.

Thies, Curt, "Microencapsulation: What it is and Purpose", Microencapsulation of Food Ingredients, pp. 1-30, 2001.

MICROENCAPSULATED OIL PRODUCT AND METHOD OF MAKING SAME

BACKGROUND OF THE INVENTION

This invention relates to a microencapsulated oil product, and to a method of making a microencapsulated oil product. More particularly, this invention relates to a microencapsulated structured lipid oil and that can be used as a vehicle for incorporating the structured lipid as a nutrient in a consumable food or beverage product. This invention also relates to consumable food and beverage products incorporating such microencapsulated structured lipids, and methods for their manufacture.

In recent years it has been learned that certain edible oil compositions can provide certain health benefits to consumers. Examples of more healthful oil compositions are disclosed in U.S. application Ser. No. 795,843, filed Mar. 8, 2004, published Sep. 8, 2005 publication number 20050196512, the disclosure of which is incorporated herein by reference in its entirety. That application discloses products that can be used in place of, or in combination with, conventional edible oil products such as domestic oils or tropical oils. The disclosed products are compositions of specially constructed edible oils in combination with a phytosterol ester component. The products have as a principal component a structured lipid which is a product of the interesterification of an edible domestic oil triglyceride and a medium chain triglyceride. These structured lipids can be combined with phytosterol esters into so-called healthful oil compositions. When desired, these compositions can be formulated with components of a type typically included within compositions for a selected intended use.

Another such healthful oil composition is described in co-pending application Ser. No. 357,162, filed Mar. 14, 2006. That application discloses a structured lipid that is a product of the interesterification of an edible domestic oil triglyceride, a medium chain triglyceride, and a conjugated linoleic acid. These structured lipids optionally can be combined with phytosterol esters into so-called healthful oil compositions. When desired, these compositions can be formulated with components of a type typically included for a selected intended use. Such oil compositions comprise an interesterified structured lipid component; the structured lipid component being a reaction product of an interesterification reactant charge, said reactant charge comprising (i) an amount of a medium chain triglyceride having fatty acid chains from C6 to C12 in length, (ii) an amount of a long chain domestic oil having fatty acid chains of at least C16 in length, and (iii) an amount of one or more isomers of conjugated linoleic acid. The oil composition optionally comprises a phytosterol ester component, and optionally one or more other edible oils.

It would be desirable to incorporate such healthful oil compositions in food and beverage products so as to impart health benefits to the consumer. Yet the use of such oil products in their liquid state could impart an unacceptable oiliness to the finished food or beverage product. Such products also could have decreased shelf-life due to the lower oxidative stability of highly unsaturated fatty acids such as those found in conjugated linoleic acid (CLA). It would thus be desirable to provide such an oil product in a for that could be added to a food or beverage product without imparting an oily quality to the food or beverage, but that would nonetheless be biologically available to the consumer when the food or beverage product is consumed.

Microencapsulation of oils is known in the art of edible oils. Microencapsulation is the coating of a liquid or solid with a protective wall material that inhibits volatilization and protects against chemical deterioration. The solid or liquid contained within the wall material is known as the core, and the complete microencapsulated particle is known as a microcapsule. Microencapsulation of oil is used to protect the oil from oxygen, water, and light, as well as to convert the oil into a free-flowing powder that can be readily incorporated into various foods. Typically, food components contained inside microcapsules are released as the food is consumed or during a food preparation step. Release of the core material is achieved by destroying the integrity of the microcapsule shell. This can be accomplished by dissolving the shell in water, melting it, or rupturing it with mechanical force. Wall materials that have been used for the microencapsulation of oil include gum arabic, carboxymethyl cellulose, alginate, gelatin, whey protein, sodium caseinate, and soy protein.

Physical processes for the microencapsulation of food ingredients use mechanical means to cause the entrapment of the core by wall materials. Typical physical methods include spray drying, air suspension coating, spray cooling and chilling, co-crystallization, and centrifugal extrusion. Microencapsulation techniques involving both physical and chemical techniques include coacervation, liposome entrapment, and inclusion complexation. Selection of the microencapsulation technique used for a particular process will depend on the economics of the different processes, the size of the microcapsules desired, the physical and chemical properties of the core and coating, the applications of the microcapsule as a food ingredient, and the desired mechanism for release of the core material.

Coacervation is a microencapsulation technique whereby the wall material is separated out of solution and deposits around the insoluble core material to form a coacervate phase. In simple coacervation, one polymer, typically a protein such as gelatin, is used to form the coacervate. The protein is first dissolved in water and a hydrophobic core material is mixed into the solution. At a neutral pH, the protein molecules will be open. As the pH is lowered, the protein molecules close up and surround droplets of the core material, thus forming microcapsules. In complex coacervation, two water soluble polymers, one cationic and one anionic, are reacted to form a microcapsule wall around a hydrophobic wall material. Typically, gelatin is used as the cationic polymer and gum arabic is used as the anionic polymer. Complex coacervation has been used to microeneapsulate oil in multiple layers of wall material.

U.S. Pat. No. 2,800,457 is a basic patent in the field disclosing the use of complex coacervation in the manufacture of oil-containing microcapsules.

U.S. Pat. No. 2,876,160 discloses a method of embedding a water-insoluble material in a starch matrix.

U.S. Pat. No. 3,786,123 discloses a method for microencapsulating a nutrient in which a mixture of the nutrient and an encapsulating agent is treated at elevated temperatures and pressures.

U.S. Pat. No. 4,217,370 discloses a process for making lipid-containing foodstuffs comprising solubilizing a particulate proteinaceous matter, admixing a lipid material to form an emulsion, and lowering the pH to aggregate the protein and simultaneously microencapsulate the lipid.

U.S. Pat. No. 4,908,233 discloses a hydrous composition containing an electrolyte and microcapsules coated with a water-soluble polymer which undergoes phase separation by action of the electrolyte.

U.S. Pat. No. 4,921,705 discloses a lipid powder with a cross-linked coating prepared by emulsifying the lipid and a water-soluble protein-containing coating agent, adding a cross-linking agent to cross-link the protein, atomizing and drying the emulsion to terminate the cross-linking reaction and to obtain lipid powders each coated with the water-soluble coating agent, and cooling the lipid powders.

U.S. Pat. No. 5,051,304 discloses microcapsules made by complex coacervation with gelatin and certain polysaccharides.

U.S. Pat. No. 5,456,985 discloses microcapsules of an oily liquid in which the coating material comprises a gastro-resistant polymer, which can be a protein, the microcapsules made by atomization of an oil-in-water emulsion of the oily liquid and an aqueous solution comprising the gastro-resistant polymer and an emulsifier. The preferred polymer is cellulose acetylphthalate.

U.S. Pat. No. 5,601,760 discloses a method for microencapsulation of a volatile or non-volatile core material such an oil in a wall system consisting essentially of a whey protein. The microcapsules are typically made by spray drying.

U.S. Pat. No. 6,149,953 discloses microcapsules comprising a core surrounded by a shell, the shell having seeding agents disposed therein to impart enhanced or unique structural and/or functional characteristics.

U.S. Pat. No. 6,475,542 and U.S. Pat. No. 6,592,916 disclose microcapsules comprising a core of an edible hydrophobic substance, and a capsule wall formed by the salting-out of a combination of a protein and an edible salt, and transglutaminase as a cross-linking agent for hardening the capsule wall.

U.S. Pat. No. 6,500,463 discloses embedding a liquid encapsulant component by admixing with at least one plasticizable matrix material, a substantially non-plasticizable matrix component, and a plasticizer, to obtain a formable, extrudable, cuttable mixture or dough.

U.S. Pat. No. 6,969,530 discloses a microcapsule comprising a loading substance, a primary shell, and a secondary shell, wherein the primary shell encapsulates the loading substance and the secondary shell encapsulates the loading substance and the primary shell, wherein the primary shell and/or the secondary shell comprises a gelatin having a Bloom number of less than 50.

U.S. Pat. No. 6,974,592 discloses a microcapsule, each comprising an agglomeration of primary microcapsules, each primary microcapsule having a primary shell and the agglomeration being encapsulated by an outer shell. Each shell material is made of first and second polymer components.

U.S. Publication No. US 2004/0017017 discloses microcapsules made by forming an emulsion of an oil component, an aqueous component, and a film forming component. The emulsion is homogenized, and pellets are produced by reducing the water content of the stabilized emulsion so that the film forming component forms a film around the oil droplets and encapsulates the encapsulant. The water content can be reduced by spray-drying.

U.S. Publication No. US 2004/0169298 discloses a microcapsule comprising an oil-based core material immiscible with water, and a shell material comprising gum arabic and an enteric anionic cellulose derivative. The method of making the microcapsule does not use either gelatin or an organic solvent.

U.S. Publication No. US 2005/0067726 discloses single and multi-core microcapsules having multiple shells, at least one of which is a complex coacervate of two components of shell materials. The core material can be a hydrophobic liquid such as various oils, the shell material can be formed from a first component which is preferably gelatine type A, and the second component is preferable gelatine type B, polyphosphate, gum arabic, alginate, carrageenan, pectin, carboxymethylcellulose, or a mixture thereof.

PCT Publication No. WO 97/48288 discloses an encapsulated material wherein the core comprises an encapsulatable material such as an oil, and the coating layer over the core comprises a protein having a mixture of hydrophobic and hydrophilic properties selected from the group consisting of isolated soy protein, whey protein isolate, caseinate and mixtures thereof.

Ijichi, K., et al., J. Chem. Eng. Of Japan, Vol. 30, No. 5, pp. 793-798 (1997) discloses microencapsulation of biphenyl using gelatin/acacia complex coacervation having multiple layers made by repeated complex coacervation.

It is one object of the invention to provide a microencapsulated oil product that can be incorporated into a food or beverage product to provide a nutritional benefit to the consumer, such as providing a source of essential fatty acids, amino acids, vegetable or animal derived protein, carbohydrates, vitamins, and minerals.

It is another object of the invention to provide such a microencapsulated product wherein the microcapsule walls are relatively strong and impervious to mechanical rupture.

It is another object of the invention to provide a method for making such a microencapsulated oil product.

It is yet another object of the invention to provide food and beverage products incorporating such microencapsulated oil products.

SUMMARY OF THE INVENTION

In accordance with the foregoing objects of the invention, a microcapsule is provided comprising a core, a first shell, and a second shell, the core preferably comprising an oil or lipid material, the first shell comprising a protein and being substantially free of carbohydrates, and the second shell comprising a carbohydrate and being substantially free of protein. The combination of two distinct shell layers provides a strong microcapsule that is resistant to undesired rupture and consequent early release of the core material, while protecting the encapsulated core material from oxidation. Where the core material is an oil product, the microencapsulated product provides a free-flowing oil product that is easy to handle and mixes well in various food and beverage products. The process of the present invention also provides for high loading of the oil product in the microcapsules, i.e., a high proportion of encapsulated oil to shell material.

Further in accordance with the invention, a method is provided for preparing a microencapsulated composition, the method comprising providing an aqueous emulsion of the protein that is to be the inner layer of the shell wall, adding a material to be encapsulated to the protein emulsion, forming a first microencapsulate shell by simple coacervation, adding a carbohydrate to the water-microencapsulate mixture, and spray drying the mixture to form a coating of carbohydrate on the microcapsules. Optionally, the single-layer microcapsules can be separated from the water-microencapsulate mixture and then introduced to a water-carbohydrate mixture to form the second shell of the microcapsule wall.

When the core material is an oil, the microencapsulated oil product is a free-flowing powder with good shelf life that can be used in a variety of food preparation processes. The microencapsulated oil product can be used, for example, in dry beverage mixes such as sport drink mixes and milk-based powdered drink mixes; in powdered or liquid infant formulas; in powdered or liquid gravies and sauces; and in baked goods, confectionery items, and snack bars. If the oil encapsulated in the microcapsules is a structured lipid with nutritional benefits, these nutritional benefits can be incorporated in the food and beverage products and passed on to the consumer. The consumer can receive additional nutritional benefits from the protein portion of the microcapsule. The various nutritional benefits of the microencapsulated oil product could help promote cholesterol reduction and weight control for some individuals. Thus the present invention encompasses such food and beverage products that are made with the microencapsulated oil product, and methods of manufacturing such food and beverage products.

DETAILED DESCRIPTION OF THE INVENTION

Figure 1:
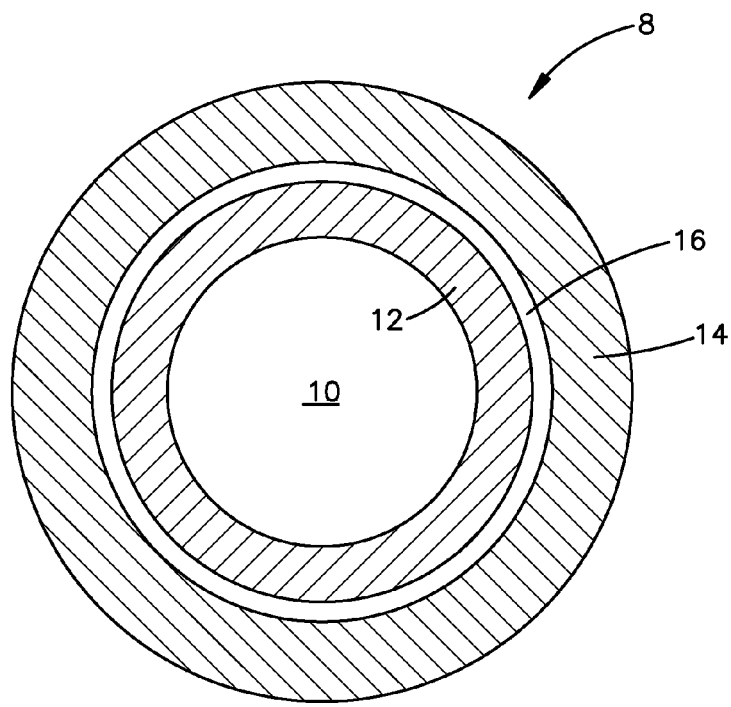
FIG. 1 is a cross-sectional view of a typical microcapsule of the present invention, not drawn to scale.
Figure 2A:
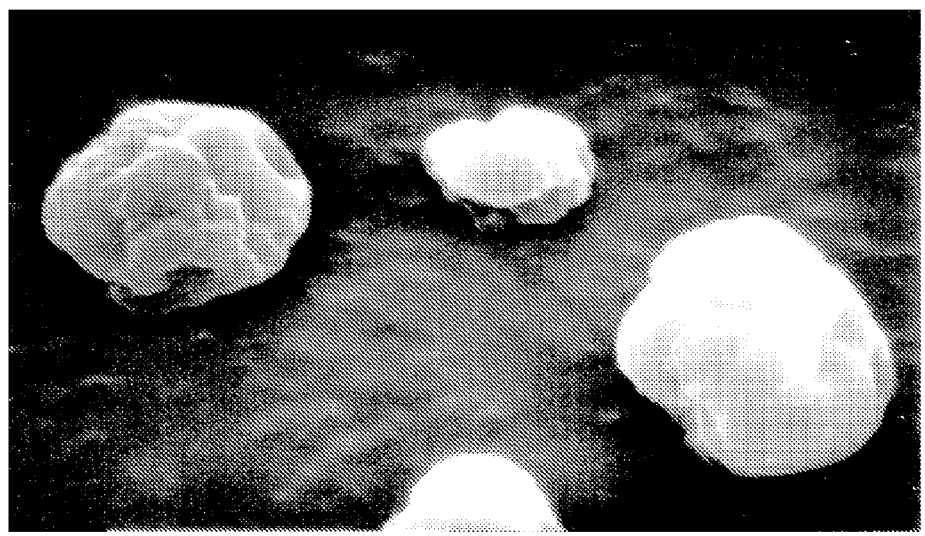
FIG. 2 is a set of microphotographs of an encapsulated oil product of the present invention.
Figure 2B:
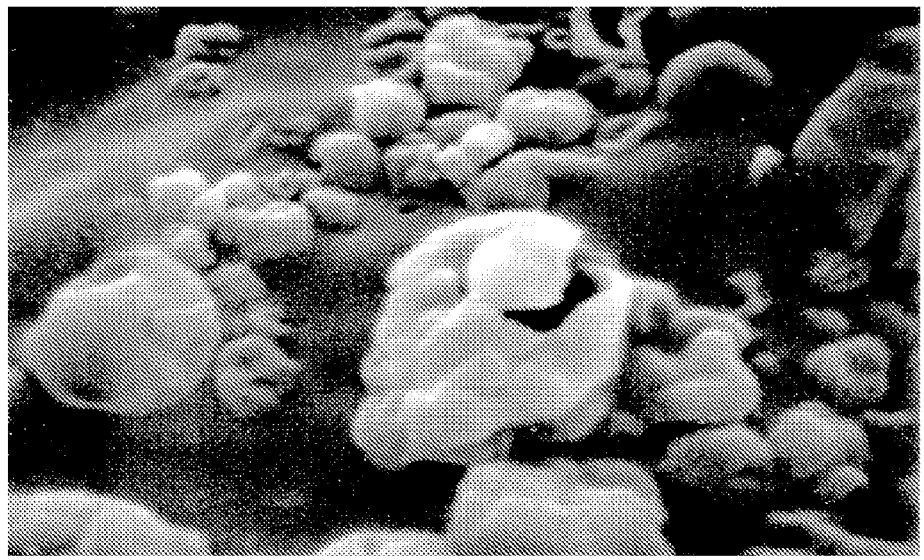
Figure 2C:
Figure 2D:
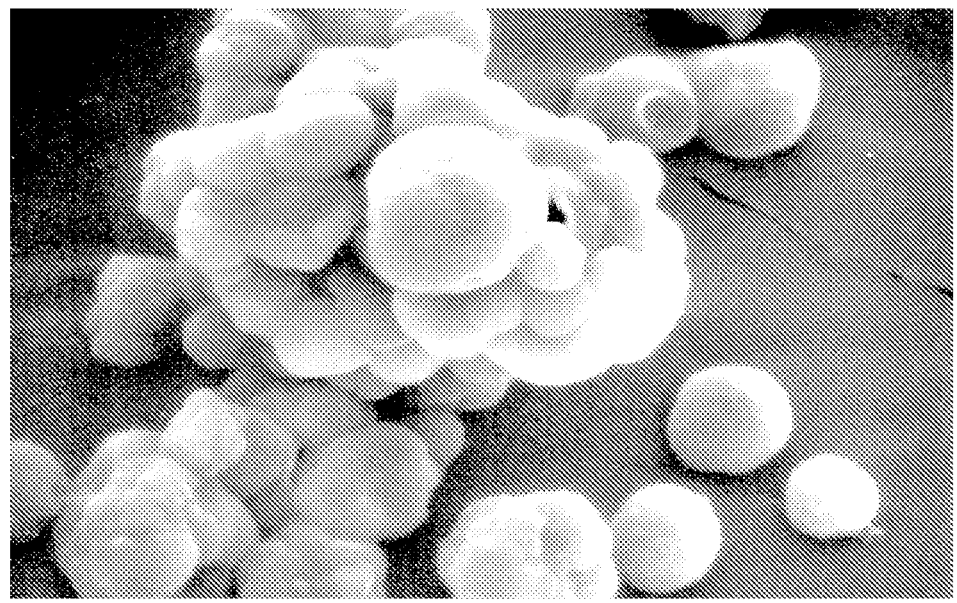

Microcapsules of the present invention comprise a core material surrounded by first and second shells, the microcapsules being suitable for use in the preparation of food and/or beverage products. The core material can be an oil or a component of a lipid product. A component of a lipid product as used in the present invention means without limitation a fatty acid, a monoglyceride, a diglyceride, a triglyceride, a fatty acid, or any one or more reaction products thereof, such as interesterification or other reaction products of any of the foregoing with any other reactants. The core material can comprise amino acids, essential fatty acids, vitamins, minerals and other nutrients beneficial to health. Referring to FIG. 1, a typical microcapsule 8 of the present invention comprises a core 10 formed of an oil or lipid, and preferably a structured lipid, the core 10 being surrounded by a first shell 12 and a second shell 14. The first shell comprises a protein, and is substantially free of carbohydrate; and the second shell comprises a carbohydrate, and is substantially free of protein. In a preferred embodiment, a film 16 of oil can be disposed between first shell 12 and second shell 14, as described more fully below.

The protein of first shell 12 functions as a barrier to protect the microencapsulated core material from oxygen. Proteins derived from animal or vegetable sources and known in the microencapsulation art can be used, including but not limited to soy proteins, whey proteins, gelatins, caseins and caseinates, wheat glutens, and mixtures thereof. As of the time of this application, preferred proteins are whey proteins, including whey protein isolate and whey protein concentrate, and soy proteins, including soy protein isolate, soy protein concentrate, and soy flour. Soy proteins are less soluble in aqueous environments than whey proteins, and can be beneficial in those products in which a slower release of the oil is desirable. Soy proteins also can be desirable for those products that are desired to be dairy-free. The protein layer also can function to provide a protein nutrient to the consumer. Other suitable proteins will be recognized by those skilled in the art of microencapsulation.

The carbohydrate layer provides additional protection over the protein layer, which can be fragile, and further promotes the compatibility of the microcapsules with foods. Suitable carbohydrates include modified starches; polysaccharides, including gum arabic; alginates; lactates, carrageenan; and mixtures thereof. Other suitable carbohydrates will be recognized by those skilled in the microencapsulation arts. Where the carbohydrate is a polysaccharide such as gum arabic, the coating can impart thickening and emulsification properties to foods and can facilitate dispersion of the microcapsules in aqueous systems and other emulsions, such as beverages and health bars. Where the outer layer is a modified starch, the microcapsules may be more compatible with flour and better suited for use in bakery products.

While any oil or lipid can be used as the encapsulated material, in some embodiments it may be preferred to use a structured lipid with certain nutritional benefits, such as the lipid product described in the aforementioned U.S. application Ser. No. 795,843, filed Mar. 8, 2004, published Sep. 8, 2005 publication number 20050196512, and the lipid product described in the aforementioned co-pending United States application Ser. No. 357,162, filed Mar. 14, 2006. Other lipid products that provide particular nutritional benefits or other desired functionalities also may be used as the core material. Those skilled in the art of microencapsulation of lipid products will appreciate that certain operating parameters of the microencapsulation process disclosed herein may have to be adapted to the properties of a particular oil or lipid material, such as differences in viscosities or tolerance for elevated temperatures. The oil can be selected to provide for the convenient delivery to the consumer of phytosterols and other nutrients such as essential fatty acids, amino acids, and vitamins. it is believed that the availability of these nutritional benefits and the use of protein can provide a substantial health benefit to the consumer over traditional shortening products.

The process of the present invention for preparing the microencapsulates comprises providing a protein/water mixture; adding a quantity of a material to be encapsulated to the mixture; forming an emulsion of the water, protein and material to be encapsulated; causing the protein to form microcapsule shells around cores of the material thereby forming an aqueous mixture of protein-shell microcapsules; and combining the protein-shell microcapsules with a quantity of carbohydrate in an aqueous medium, whereby the carbohydrate will form a second shell over the first protein shells of the microcapsules. The protein/water mixture will be about 20-30% protein by weight, preferably about 25-28% protein by weight, at ambient temperature. The mixture is brought to about 50° C. to help dissolve the protein, and a quantity of the material to be encapsulated, such as an oil or other lipid, is added to the mixture. The mixture is emulsified such as by using a mixer for about one to five minutes. After emulsification, the protein can be caused to form microcapsules either by lowering the pH of the mixture, or by addition of an emulsification agent, or both. Mixing can continue as needed. If the emulsification agent is a carbohydrate such as maltodextrin, a small amount of the carbohydrate may be incorporated in the first protein layer, but this amount is small enough that the protein layer is still deemed to be substantially free of carbohydrate, within the meaning of that term in the context of this patent application. If foaming occurs during emulsification, the emulsification mixture can be deacrated under vacuum, such as with a rotary evaporator. The pH of the mixture can be adjusted to about 4.5 by adding an acid solution. One acid solution that is suitable for this purpose is 0.5N HCl; other suitable acid solutions will be readily apparent to those skilled in the art. The acidified emulsification is then mixed for about an hour at ambient temperature, allowing simple coacervation to occur to form microcapsules. Depending on reaction conditions, both single microcapsules and agglomerated microcapsules may be present.

The protein used in the process of the present invention should have a solubility in water sufficient to facilitate the simple coacervation step. The preferred protein will have good solubility in water at 50° C. and neutral pH, and lower solubility at ambient temperature and reduced pH, to facilitate the coacervation process. Good solubility at 50° C. also means that more of the protein will be available for the coacervation process. The preferred protein used will have a solubility in water at about 50° C. of about 65% or greater, preferably about 75% or greater, and more preferably about 90% or greater.

Suitable emulsification agents for the protein solution include maltodextrin, β-cyclodextrin, calcium alginate, and gum arabic. Other emulsification agents will be recognized by those skilled in the art. The emulsification agent is typically added as a solution. The amount of emulsification will vary with the particular agent selected. Typical quantities of emulsification agent range from about 2-6% by weight of the entire emulsification mixture. The next step in the inventive process is to combine the protein-shell microcapsules with carbohydrate in an aqueous medium. Optionally, the microcapsules with a protein single layer of protein first can be recovered from the emulsion by means such as spray-drying, and then added to a carbohydrate water mixture. Alternatively, the carbohydrate for the second layer can be added directly to this emulsion still containing the protein layer microcapsules without first separating the protein layer microcapsules. To accomplish this, a mixture of water and carbohydrate is prepared, typically about 20% (w/v), and the temperature of the mixture is raised to about 45-60° C. to dissolve as much of the carbohydrate as possible. The temperature of the carbohydrate mixture can be adjusted to about 45° C., and then mixed with either the previously separated protein coacervate microcapsules, or, if the microcapsules have not been separated, the carbohydrate mixture can be added directly to the previously formed emulsion which still contains the microcapsules. It is a particular advantage of the present invention that the step of separating the single-layer protein microcapsules from the emulsion prior to the addition of the carbohydrate can be eliminated. Further, when the carbohydrate mixture is added directly to the emulsion, a thin film of lipid 16 can form between the protein layer 12 and the carbohydrate layer 14, thereby increasing the total oil load carried by each microcapsule.

The resulting mixture is preferably de-aerated, homogenized to make the microcapsules as uniform as possible and remove lumps, and finally spray dried resulting in microcapsules having a core of an oil or lipid component, an inner shell of protein, and an outer shell of carbohydrate. On a laboratory scale, spray drying was accomplished with dryer inlet temperatures of about 150-200° C. and dryer outlet temperatures of about 75-95° C. Larger scale operations may allow higher dryer inlet temperatures of about 200-220° C. which may lead to a rapid crust formation and greater oil retention, resulting in greater microencapsulation efficiency. It also may be desirable to use a rotary atomizer rather than a nozzle atomizer, to avoid excessive shear and damage to the spray-dried microcapsules, and to produce more uniform microcapsules. The resulting microcapsules preferably have a particle size distribution of less than 100 µm, preferably about 25-75 µm, although some can be even smaller.

Oil load as used in the present application means the maximum amount of oil that can be incorporated in forming encapsulations without having significant surface oil on the encapsulates, relative to the total weight of the microcapsules. In accordance with the present invention, microcapsules can be prepared with oil load ratios ranging from about 20-60% on a dry weight basis. The preferred range is about 45-55% on a dry weight basis, and most preferably about 50%. The microcapsules contain preferably about 12-25%, more preferably about 16-22%, of carbohydrate, and about 20-30%, preferably about 26%, of protein.

The microcapsules of the present invention are particularly well suited for use in the preparation of consumable products including food and beverage products, and mixes for making food and beverage products. The microcapsules are present as a free-flowing powder, yet exhibit good wettability. In a food or beverage product made with the microcapsules of the present invention, the microcapsules may or may not be intact in the final food or beverage product, depending on the nature of the food or beverage product and how it is made. For example, in a baked product in which the microcapsules are substituted for all or part of the shortening that would normally be used, it is expected that the walls of the microcapsules will be broken down during the mixing or heating steps in the manufacture of the baked product. In other food or beverage products the microcapsules can remain intact. In particular, when the consumable product is a mix for use in making a finished food or beverage product, the microcapsules will be intact. The phrase "made with microcapsules" as applied to consumable products of the present invention means that the microcapsules of the present invention were used in the manufacture of the consumable product, regardless of whether the microcapsules are intact in the final product, and regardless of whether the consumable product is a finished food or beverage product or a mix for making a food or beverage product.

EXAMPLES

The following examples are presented by way of illustrating the methods and microencapsulation products of the present invention, and not by way of limitation. Examples 1-3 and 7-9 illustrate the feasibility of various materials as single-layer encapsulating agents; the remaining examples illustrate the multi-layer microcapsules of the present invention. In all of these examples the following materials were used, although those skilled in the art will recognize that equivalents of these materials also could be used within the scope of the present invention.

Whey protein isolate, 95% whey protein—BiPRO®, available from Davisco Foods, International, Eden Prairie, Minn.

Whey protein concentrate, 80% protein—Protient® 8500, Protient, Inc., St. Paul, Minn.

Whey protein isolate, 90% protein—Protient® 9500, Protient, Inc., St. Paul. Minn.

Soy protein isolate, 90% protein—Protient® 6340, Protient, Inc., St. Paul, Minn.

Organic soy protein concentrate, 72% protein—Organic ISO III (S800), Nutriant, Cedar Falls, Iowa Soy protein concentrate, 68% protein—Standard Soy Concentrate (S700), Nutriant, Cedar Falls, Iowa Soy flour, 53% protein—Low Fat Flour (S120), Nutriant, Cedar Falls, Iowa Soy protein isolate, 90% protein—Ardex® F, Archer Daniel Midland, Decatur, Ill.

Maltodextrin (DE=10)—Star-Dri®, A. E. Staley Mfg. Co., Decatur, Ill.

Modified Starch—Mira Mist® 673, Tate & Lyle, Decatur, Ill.

The batch of oil from which samples were taken and subjected to various microencapsulation procedures in the following examples was a structured lipid product made in accordance with the procedures disclosed in the aforementioned U.S. patent application Ser. No. 795,843, filed Mar. 8, 2004, published Sep. 8, 2005 publication number 20050196512. Specifically, a mixture was prepared of about 47 parts of a high oleic canola oil (HOCO) containing about 70% oleic acid and obtained from Bunge Oils, Inc. and sold under the name Nutra-Clear HS®; and about 47 parts of a medium chain triglyceride (MCT) product with a majority of $C_8C_{10}$ fatty acids, obtained from Stepan Company and sold under the name Neobee® 1053. The mixture was interesterified under the following conditions: The MCT product and HOCO were interesterified at 90-94° C. under vacuum of about 5-100 millibars (4-75 mm Hg) with a sodium methoxide catalyst at 0.1-0.5% for about thirty minutes, then neutralized with 0.7% citric acid solution of 42% strength. The reaction mixture was treated with 0.5% Trisyl® 650 from W. R, Grace, and FilterAid 0.5%. The oil was then deodorized at about 227.7-232.2° C., at about 2.66 millibars (4 mmHg), steam 0.4% per hour for four hours. This deodorized oil was then physically blended with 6 parts phytosterol esters obtained from Forbes Meditech Co., of Vancouver, Canada and sold under the name Reducol® for about 30 minutes at 27° C.

Example 1

Determination of Protein Solubility

A preferred protein for use in the present invention has good solubility at 50° C. and lower solubility at pH 4.5, 21° C., to facilitate effective coacervation. To determine solubility, a ten gram sample of each protein source was mixed into 100 ml of deionized water and the pH of the mixture was determined. The samples were held at the required temperature for thirty minutes with stirring at about 145-190 rpm, then filtered through a Whatman #4 filter paper with vacuum. Duplicate samples of each filtrate were dried in a forced air oven at 130° C. for 2 hours, and the total solids remaining were dried and weighed to determine the solubility, i.e., the amount of solids that had been dissolved in the filtrate. For those samples evaluated for solubility at pH 4.5, the sample was mixed for thirty minutes at 50° C., then cooled to 21° C., and the pH was adjusted to 4.5 with 0.5 N HCl. The percent solubility of the protein sample was calculated as $$\% \text{ Solubility} = \frac{\% \text{ total solids in filtrate}}{(10 \text{ g}/100 \text{ ml}) \times 100} \times 100$$

The results are set forth in Table 1.

TABLE 1

| Protein Source | pH of 10% Solution | % Solubility at 21° C. | % Solubility at 50° C. | % Solubility at 21° C., pH 4.5 |
|---|---|---|---|---|
| (a) Soy protein isolate (90% protein), ADM Ardex ® F | 7.23 | 50.4 | 74.4 | 8.6 |
| (b) Organic soy protein concentrate (72% protein), Nutriant ® ISO III | 7.59 | 35.8 | 57.2 | 8.1 |
| (c) Soy protein concentrate (68% protein) Nutriant ® S700 | 7.37 | 36.8 | 56.3 | 18.8 |
| (d) Low fat soy flour (53% protein) Nutriant ® S120 | 6.96 | 30.1 | 36.7 | — |
| (e) Soy protein isolate (90% protein) Protient ® 6340 | 6.64 | 35.2 | 39.5 | — |
| (f) Whey protein isolate (95% protein) BiPRO ® from Davisco Foods | 7.00 | 91.5 | 96.9 | 88.8 |
| (g) Whey protein isolate (90% protein) Protient ® 9500 | 6.20 | 87.1 | 92.6 | 91.8 |
| (h) Whey protein concentrate (80% protein) Protient ® 8500 | 6.67 | 87.3 | 91.9 | — |

Of the soy products tested, the 90% soy isolate of Example 1(a) exhibited the greatest difference between solubility at 50° C. and solubility at pH 4.5, 21° C., and therefore was most effective for coacervation. It also had the greatest solubility at 50° C., and therefore had the most protein available for coacervation. Of the whey products tested, the 95% whey protein isolate of Example 1(f) had the greatest difference in solubilities at 50° C. and 21° C., respectively, and the greatest solubility at 50° C.

Example 2

Preparation of Protein-Oil Coacervates

The following procedure was used to prepare protein-oil coacervates for each of the proteins of Examples 1(a), 1(c), 1(f), and 1(g) as indicated in Table 1. For each protein sample, 100 ml of a 10% solution (w/v) was prepared. The solution was heated to 50° C. to help dissolve the protein. To each solution was added 12 g of the structured lipid prepared as described above. The mixtures each were emulsified for one minute using a PT 10-35 Polytron® mixer, manufactured by Kinematica AG, Lucerne Switzerland operating at about 13,500 rpm. To each emulsification was added 50 ml of a 4% (w/v) solution of maltodextrin DE 10 sold under the name Star-Dri by A. E. Staley Mfg. Co, Decatur Ill., used as an emulsification agent, and emulsification was continued for one minute. The pH of each emulsification was adjusted to 4.5 using 0.5 N HCl, and the emulsifications were mixed gently at about 145-190 rpm for about two hours at room temperature. The resulting mixtures were then spray dried with an inlet temperature of about 180° C. and an outlet temperature of about 75° C. The products were in the form of microcapsules of the structured lipid encapsulated in single layer shells of the various proteins. The protein shells might contain small amounts of the maltodextrin emulsification agent, but are considered to be substantially carbohydrate free for the purposes of the present invention.

Example 3

Preparation of Whey Protein-Oil Coacervates

Using the whey protein sample of Example 1(f), respectively, 300 ml of a 10% solution (w/v) was prepared. The solution was heated to 50° C. to help dissolve the protein. To the solution was added 36 g of the structured lipid prepared as described above. The mixture was emulsified for one minute using a PT 10-35 Polytron mixer, manufactured by Kinematica AG, Lucerne Switzerland at about 13,500 rpm. To the emulsification was added 150 ml of a 4% (w/v) solution of maltodextrin DE 10 sold under the name Star-Dri by A. E. Staley Mfg. Co, Decatur Ill., for use an emulsification agent, and emulsification was continued for one minute. The pH of the emulsification was adjusted to 4.5 using 0.5 N HCl, and the emulsification was mixed gently at about 145-190 rpm for one hour at room temperature. The resulting mixture was then spray dried with an inlet temperature of about 180° C. and an outlet temperature of about 75° C. The product was in the form of microcapsules of the structured lipid encapsulated in single-layer shells of whey protein. The protein shells might contain very small amounts of the maltodextrin emulsification agent, but are considered to be substantially carbohydrate free for the purposes of the present invention.

Example 4

Preparation of Multi-Layer Soy/Starch Microcapsules

In the first part of this procedure, the procedure for preparation of a protein-oil coacervate of Example 3 above was followed, except that (a) the soy protein isolate of Example 1(a) was used in place of the whey protein isolate of Example 1(f), and (b) the single layer microcapsules were observed precipitating from the dispersion, but were allowed to remain in the dispersion instead of being subjected to spray drying at this stage.

In the second part of this procedure, a starch mixture was prepared by mixing 100 g of modified starch sold under the name Mira-Mist 673 by Tate & Lyle, Decatur, Ill. into 250 ml of deionized water. The mixture was stirred at about 145-190 rpm for fifteen minutes, and heated to 50° C. to dissolve the starch. To the starch/water mixture was added 100 ml of the structured lipid prepared as described above, to load additional oil into the microcapsule between the protein and starch layers. The resulting starch/water/lipid mixture was homogenized for 1 minute in the same Polytron mixer at 13,500 rpm, and the temperature of the homogenized mixture was adjusted to 45° C. The dispersion of single layer soy protein coated microcapsules as prepared above was preheated to 45° C. and added to the homogenized starch mixture. This mixture was stirred vigorously at 5000 rpm for thirty minutes while being allowed to cool to room temperature, and without vortexing air into the mixture. The resulting mixture was then spray dried with an inlet temperature of about 180° C. and an outlet temperature of about 75° C. The product was in the form of microcapsules of the structured lipid encapsulated in a first shell of soy protein and a second shell of starch, with a film of the structured lipid disposed between the shells.

Example 5

Preparation of Multi-Layer Soy/Starch Microcapsules

The procedure of Example 4 was followed up through the step of adding the single-layer microcapsule mixture to the starch mixture at 45° C. At that point, instead of mixing vigorously for 30 minutes, the mixture was stirred vigorously at 5000 rpm for five minutes without vortexing air into the mixture. The mixture was then transferred to a rotary evaporator and held under vacuum at 20-25° C. for twenty minutes while agitating. The resulting mixture was then spray dried with an inlet temperature of about 180° C. and an outlet temperature of about 75° C. The product was in the form of microcapsules of the structured lipid encapsulated in a first shell of soy protein and a second shell of starch, with a film of the structured lipid disposed between the shells.

Example 6

Preparation of Multi-Layer Microcapsules with Alginate/Lactate Outer Layer

In this example, the goal was to make and evaluate multi-layer microcapsules having an oil load of about 20%. The protein samples used were the soy isolate product of Example 1(a), the soy concentrate product of example 1(c), and the whey isolate product of Example 1(f). For each protein, 300 ml of a 10% solution w/v was prepared. Each solution was heated to 50° C. to help dissolve the protein. To each solution was added 15 g of the structured lipid prepared as described above. Each mixture was emulsified for one minute using a PT 10-35 Polytron mixer, manufactured by Kinematica AG, Lucerne Switzerland at about 13,500 rpm. To each emulsification was added 150 ml of a 4% (w/v) solution of maltodextrin DE 10 sold under the name Star-Dri by A. E. Staley Mfg. Co, Decatur Ill., for use as an emulsification agent, and emulsification was continued for one minute. The pH of the emulsifications was adjusted to 4.5 using 0.5 N HCl, and each emulsification was mixed gently at 145-190 rpm for one hour at room temperature. The resulting compositions were then spray dried with an inlet temperature of about 180° C. and an outlet temperature of about 75° C. to create a single layer encapsulate.

There was prepared 100 g of a mixture of 2% (w/w) sodium alginate obtained from C. P. Kelco Corp. of San Diego, Calif., with heating to dissolve the alginate. To the solution was added a dispersion of 4 g of the dried microcapsules made with the soy isolate of Example 1(a) mixed in 10 g water. The alginate/water/microcapsule mixture was mixed vigorously for fifteen minutes without vortexing air into the mixture. To this mixture was added 50 ml of a 20% solution of calcium lactate, and mixing continued for another fifteen minutes. Homogenization can be used at this step. The mixing speed was then reduced to keep the microcapsules in suspension, and the microcapsules were spray dried. Multi-layer microcapsules were obtained having a lipid core surrounded by a first inner shell of protein and a second outer shell of alginate/lactate.

Example 7

Preparation of Single Layer Gum Arabic Microcapsules

This experiment was conducted to verify that microcapsules could be formed with a gum arabic-maltodextrin shell wall. A solution was prepared of 75 g of gum arabic sold under the name Spray Gum® by Colloides Naturales of Bridgewater, N.J. and 5 g. of maltodextrin (DE 10) sold under the name Star-Dri by A. E. Staley Mfg. Co, Decatur Ill. in 400 ml water heating if necessary to completely dissolve the gum and maltodextrin. To this solution was added 100 g of the structured lipid prepared as described above, and the mixture was stirred for ten minutes to disperse the oil. The mixture was de-aerated in a rotary evaporator under vacuum t 30° C. for 15 minutes. The mixture was homogenized for two minutes, then spray dried using an inlet temperature of about 180° C. and an outlet temperature of about 75° C. Single layer microcapsules were obtained.

Example 8

Preparation of Single Layer Maltodextrin Microcapsules

This experiment was conducted to verify that microcapsules could be formed with a maltodextrin shell wall. A solution was prepared by dissolving 75 g of maltodextrin DE 10 sold under the name Star-Dri by A. E. Staley Mfg. Co, Decatur Ill. in 400 ml water. The mixture was heated until the maltodextrin was completely dissolved. To the solution was added 0.15 g of Precept 8010 lecithin, and the mixture was heated to 40-50° C. to dissolve the lecithin. To this solution was added 75 g of a sample of the structured lipid prepared as described above, and the composition was stirred for ten minutes to disperse the oil. The mixture was de-aerated by holding under a vacuum in a rotary evaporator at 30° C. for fifteen minutes. The mixture was then homogenized for two minutes using the Polytron mixer as described above. Particle size could be determined by viewing under a microscope. The mixture was then spray dried using an inlet temperature of about 180° C. and an outlet temperature of about 75° C. Single layer microcapsules were obtained.

Example 9

Preparation of Single layer β-Cyclodextrin Microcapsules

This experiment was conducted to verify that microcapsules could be formed with a β-cyclodextrin shell wall. A solution was prepared by dissolving 25 g of β-cyclodextrin obtained from Cerezata (A Cargill Company) in Wayzata, Minn., in 500 ml water at 60° C. until all the β-cyclodextrin was dissolved. To this solution was added 75 g of a sample of the structured lipid prepared as described above, and the composition was stirred for ten minutes to disperse the oil. The mixture was then homogenized for two minutes using the Polytron mixer as described above. Particle size could be determined by viewing under a microscope. The mixture was then spray dried using an inlet temperature of about 180° C. and an outlet temperature of about 75° C. Single layer microcapsules were obtained.

Example 10

Preparation Soy/Gum Arabic Multi-Layer Microcapsules

For the soy protein sample of Example 1(b), 500 ml of a 10% solution (w/v) was prepared. The solution was heated to 50° C. to help dissolve the protein. To the solution was added 90 g of the structured lipid prepared as described above. The mixture was emulsified for one minute using the Polytron mixer as described above. To the emulsification was added 250 ml of a 4% (w/v) solution of maltodextrin DE 10 sold under the name Star-Dri by A. E. Staley Mfg. Co, Decatur Ill., and emulsification was continued for one minute. The pH of the emulsification was adjusted to 4.5 using 0.5 N HCl, and the emulsification was mixed gently at 145-190 rpm for one hour at room temperature to create an aqueous dispersion of single layer encapsulates comprising a lipid core and a soy protein coating.

A gum arabic mixture was prepared by mixing 30 g of gum arabic sold under the name Spray Gum® by Colloides Naturales of Bridgewater, N.J., into 120 ml of deionized water. The mixture was stirred at 145-190 rpm for fifteen minutes, and heated to 50° C. to dissolve the gum. The temperature of the gum/water mixture was adjusted to 45° C., and the mixture was added to the dispersion of single layer protein coated microcapsules. This mixture was stirred vigorously at 13,500 rpm for thirty minutes without vortexing air into the mixture, and allowed to cool to room temperature. The resulting mixture was then spray dried with an inlet temperature of about 180° C. and an outlet temperature of about 75° C. Multi-layer microcapsules were obtained having a soy protein first inner shell and a gum arabic second outer shell.

Example 11

Preparation of Whey/Gum Arabic Multi-Layer Microcapsules

The procedure of Example 10 was followed, except the 95% whey protein isolate of Example 1 (f) was used in place of the soy protein. Multi-layer microcapsules were obtained having a whey protein first inner shell and a gum arabic second outer shell.

Example 12

Preparation of Whey/Modified Starch Multi-Layer Microcapsules

The procedure of Example 5 was followed, except that the BiPro® 95% whey protein isolate was used in place of the soy protein. The product was in the form of microcapsules of the structured lipid encapsulated in a first shell of whey protein and a second shell of starch, with a film of the structured lipid disposed between the shells.

To determine the suitability of the various microencapsulated oil products for use in different food and beverage products, the microcapsules were evaluated for percent free oil, wettability, and spray dry ratio. The results of all three evaluations is set forth in Table 2 below.

Free oil content provides a measure of the percentage of surface oil on the microcapsule and the oil exposed to the atmosphere through cracks in the surface of the microcapsules, thus indicating the microencapsulation efficiency. To measure the amount of free oil, a two gram sample of dry microencapsulate is placed in a round bottom flask and extracted with ten ml of petroleum ether for one minute at 21-24° C. The mixture is filtered through a glass microfibre filter paper supplied by Whatman, Inc., Florham park, NJ, and the filtrate is collected in a pre-dried and pre-weighed round-bottom flask. The petroleum ether is evaporated using a rotary evaporator with heating to about 65° C. The residual oil is dried in a convection oven for about ½ hour at 105° C., then cooled in a dessicator. The flask is weighed to determine the amount of residual oil, and percent free oil is calculated as the amount of surface oil per gram of microcapsules. As seen in Table 2 below, for soy protein, single layer microcapsule had a free oil content of 43%; but in the multi-layer structures of the present invention, the free oil values advantageously were reduced to 34% when either starch or gum is used as the second layer. For whey protein, the single layer structure had a free oil content of 29%, and the whey/starch and whey/gum multi-layer structures had free oil contents of 28% and 35%, respectively.

Wettability of the spray dried microcapsules was evaluated according to the method described by Regenstein, J. M. and Regenstein, C. E., 1984, Food Protein Chemistry, Academic Press, Inc., New York.: 290. One gram of microencapsulate was placed on the surface of 80 ml of deionized water in a 100 ml beaker containing a magnetic stirring bar. The sample was held at room temperature without any agitation for 30 minutes. After the 30 minute period, the sample was stirred sufficiently fast to form a vortex that reached the bottom of the beaker. Stirring was maintained for two minutes, then the agitation was stopped. The wettability was graded as follows:

"Excellent"—powder wets as soon as it contacts the water without stirring After 30 minutes of hold time the sample is completely dispersed.

"Good"—powder wets only slightly when it comes into contact with water. After 30 minutes of hold time the sample is wet and the powder has sunk to the bottom. Stirring disperses the sample.

"Fair"—powder wets very slightly on initial contact, also tends to clump and remain at the surface. After 30 minutes of hold time the sample is still at the surface, although some of the sample has dispersed. Stirring causes most of the sample to disperse, although after stirring is stopped a few clumps remain.

"Poor"—powder hardly wets when it initially comes in contact with water, and clumps. After 30 minutes of hold time the solution is slightly cloudy but most of the sample is still in clumps at the surface. Stirring does not disperse the clumps. After the stirring is stopped, most of the sample still floats as clumps.

The spray dry ratio is another indication of the effectiveness of microencapsulation. Spray drying where used in each of the above examples was accomplished with a Buchii 190 Dryer (Buchii Labortechnik AG Flawil, Switzerland spray dry apparatus. The weight of the product recovered in the product collector (PC) was compared to the weight of the product retained in the drying chamber (DC).

TABLE 2

| Microencapsulation System | % Free Oil | Wettability | Spray dry ratio(product collector/drying chamber) |
|---|---|---|---|
| Whey single layer (Example 3) | 29 | Good | 0.9 |
| Soy single layer (Example 2) | 43 | Good | 0.7 |
| Soy/modified starch (Example 4) | 34 | Good | 0.7 |
| Soy/gum arabic (Example 10) | 34 | Excellent | 1.1 |
| Whey/modified starch (Example 12) | 28 | Fair | 1.0 |
| Whey/gum arabic (Example 11) | 35 | Fair | 0.9 |

The data demonstrate that the soy/gum arabic product of Example 10 exhibited the best wettability and the best spray dry ratio.

Scanning electron micrographs of the multi-layer microcapsules of example 10 are illustrated in FIGS. 2 (A)-(D). Samples for these SEM scans were prepared by fixing the powder to sample stubs using double sided tape, and sputter coating them with gold. The samples were examined at an accelerating voltage of 15.1 kV. The individual microcapsules generally ranged in size from about 25-75 μm, although some were as small as 2-15 μm. The rough surfaces visible in the micrographs are characteristic of carbohydrate coatings. The "dimples" in the microcapsules suggest the presence of concavities in the underlying thin protein inner layer; this dimpled structure has been noted in the literature in relation to single layer protein-coated microcapsules and has been attributed to shrinkage of the protein and uneven drying of the microcapsules. Agglomerates of microcapsules were also evident and are believed to be due to adherence of the gum arabic outer layers of the microcapsules.

The method of the present invention as described above with respect to a laboratory scale can be adapted to pilot plant scale. For example, as presently understood, preparation of the protein solution can be accomplished in a stainless steel vacuum reactor fitted with a propeller stirrer or other coarse mixer. Once the protein is dissolved at about 50-60° C., the oil can be added directly into the reactor. Coarse homogenization of the protein-oil mixture can be performed using an in-line mixture or similar style homogenizer. It is expected that high pressure homogenization will not be required for formation of the microcapsules. A maltodextrin solution, if used, can be prepared in a jacketed tank. After addition of the optional maltodextrin, the mixture can be stirred vigorously or re-circulated through the in-line mixer. A vacuum can be applied to minimize the incorporation of air into the product. After adjusting the pH to 4.5, the mixture can be stirred gently with an overhead mixer while the single-layer microcapsules precipitate out of solution. The resulting single layer microcapsules should be less than about 100 μm, with an average particle size of about 25-75 μm by microscopic analysis. Continuing with the description of the process on a pilot plant scale, the carbohydrate solution can be prepared in the jacketed tank at 45-60° C. This carbohydrate solution will then be mixed with the inner-layer microcapsules and re-circulated through an in-line mixer fitted with coarse rotors. Vacuum can be applied to the reactor in order to minimize the incorporation of air into the microcapsules. Cooling water can be applied to the jacket of the tank while mixing to allow the microcapsules to develop at 20-25° C. Spray drying of the resulting multi-layer capsules can be performed on a co-current dryer fitted with either a rotary or nozzle atomizer. The inlet and outlet temperatures can vary with the design of the dryer, with suggested initial conditions of 180° C. at the inlet and 75° C. at the outlet. Further wettability of the microcapsules can be enhanced using other dryer designs such as a fluidized spray dryer to agglomerate the capsules. Wettability also may be enhanced by adding lecithin to the final product. This can be accomplished by spraying the microcapsules with a coating of lecithin in the fluid-bed section of a fluidized-spray dryer, or by spraying lecithin into the air stream inlet of a co-current spray dryer.

Figure 3:
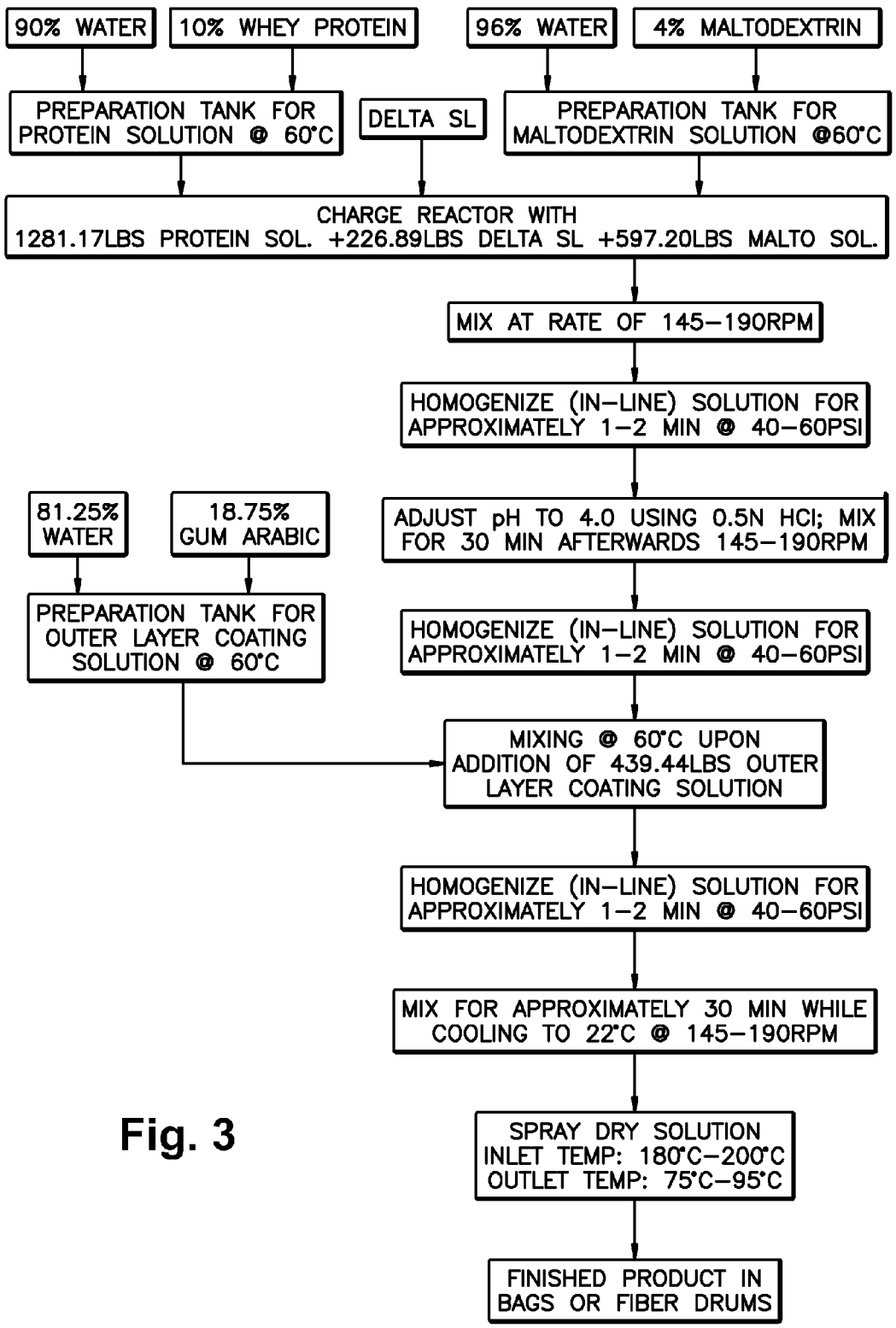
FIG. 3 is a flow chart of an example of a pilot plant scale operation for making multilayer microcapsules having a whey protein inner shell and a gum arabic outer shell, in accordance with the present invention.

Pilot-plant scale tests were run manufacturing multi-layer microcapsules of structured lipids with either soy or whey inner shells and modified starch outer shells, using the same materials as used in the above examples. FIG. 3 illustrates a flow chart of a presently preferred embodiment of a pilot plant process for making a whey/gum arabic multilayer encapsulated lipid product. The term "Delta SL" as used in FIGS. 3 and 4 indicates a proprietary oil composition of the assignee herein that was encapsulated in accordance with the microencapsulation process of the present invention. A solution of 10% whey product and 90% water is prepared and maintained at 60° C. Another solution is made of 4% maltodextrin in 96% water, and also maintained at 60° C. The oil to be encapsulated is the same oil product as was used in the above examples. The two solutions and the oil are charged to a reactor vessel in the proportions of 1281.17 lbs protein solution, 226.89 lbs oil product, and 597.20 lbs maltodextrin solution. The contents of the reactor are mixed at a rate of 145-190 rpm for about ten minutes at a temperature of about 60° C., and the mixture is then homogenized. The pH of the reaction mixture is adjusted to 4.0 using 0.5N HCl, and mixing is continued for about 30 minutes at 145-190 rpm. The mixture is then homogenized for 1-2 minutes at 40-60 psi. This produces single layer microcapsules with a whey protein shell and an oil product core. A solution is prepared of 18.75% gum arabic in 81.25% water at 60° C. A quantity of 439.44 lbs of this solution is added to the reactor, and the contents are mixed at 60° C. The contents of the reactor are homogenized for about 1-2 minutes at 40-60 psi, then mixing is continued for about 30 minutes at 145-190 rpm while the mixture cools to 145-190 rpm. This process causes a second gum arabic shell to form around the microcapsules; some of the excess oil in the reaction vessel mixture that was not encapsulated by the protein can form a film between the protein and gum arabic shells. The resulting mixture is then spray dried at an inlet temperature of about 180-200° C. and an outlet temperature of 75-95° C. The resulting product is dry, free-flowing microcapsules that can be packed in bags or fiber drums. Microencapsulated oil products made by this process were found to have an oil load of about 48-50%, and a moisture content of about 2-3%.

Figure 4:
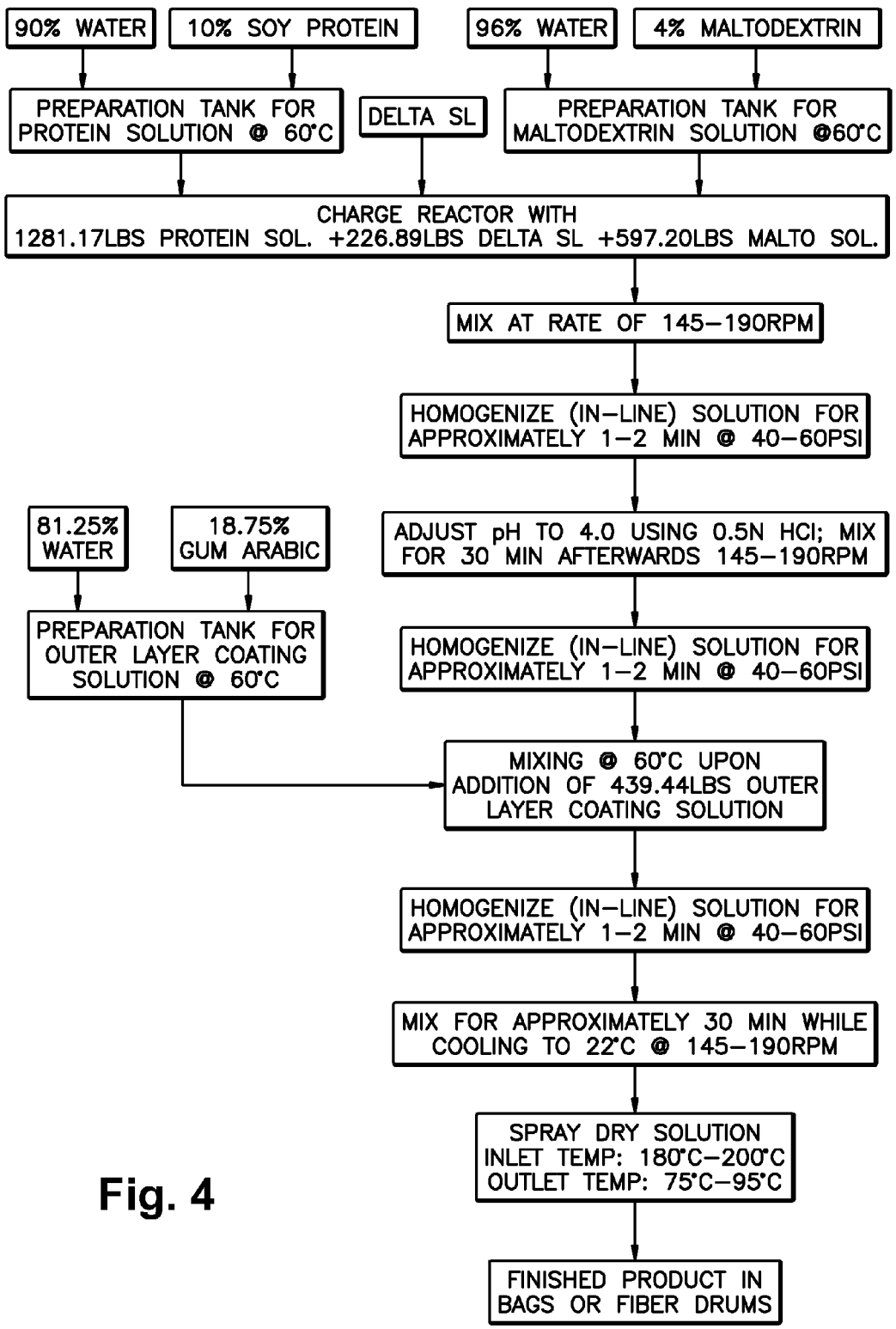
FIG. 4 is a flow chart of an example of a pilot plant scale operation for making multilayer microcapsules having a soy protein inner shell and a gum arabic outer shell, in accordance with the present invention.

FIG. 4 illustrates a presently preferred embodiment of a pilot plant process for making microencapsulated oil products using a soy protein for the first shell instead of whey. It may be seen that the two processes are identical. The resulting product is dry, free-flowing microcapsules that can be packed in bags or fiber drums. Microencapsulated oil products made by this process were found to have an oil load of about 48-50%, and a moisture content of about 2-3%.

Attempts were made to achieve an oil load of about 60%. While such microcapsules could be prepared, they had a tendency to stick together and did not flow as freely as those with about 50% oil load.

Example 13

Preparation of Beverage Mixes

An isotonic beverage mix was formulated based on a beverage mix described in *Food Products Formulary*, Vol. 4, "Fabricated Foods," (Inglett and Inglett, 1982), p. 35, and using the microencapsulated oil of Example 11 above, as follows.

| Ingredient | % by weight |
|---|---|
| Glucose | 91.00 |
| Citric acid (anhydrous powder) | 4.00 |
| Salt | 2.00 |
| Microencapsulated oil | 1.00 |
| Sodium phosphate | 0.70 |
| Potassium phosphate | 0.60 |
| Lecithin | 0.10 |
| Ascorbic acid | 0.50 |
| Sodium benzoate | 0.10 |

Flavors and colors were added to the desired level to prepare lemon and orange flavor beverages. The beverage mix was used to prepare flavored beverages having a flavor and consistency appealing to consumers. The microcapsules of the present invention can be used either in a beverage mix as described above, or in a ready-to-drink beverage.

The microcapsules of the present invention also could be used in a milk-based beverage, either in the form of a mix for such a beverage or in a ready-to-drink form. Those skilled in the art of such milk-based beverages will recognize how such microcapsules can be incorporated into milk-based beverage products. As used herein, the term "milk" is intended to encompass both conventional dairy milks of various fat levels and non-dairy milk products, such as soy milks, rice milks, nut milks, and the like.

The microcapsules of the present invention also can be used in the manufacture of infant formulas. Such formulas can be prepared in powdered form, liquid concentrates, and ready-to-feed forms. Those skilled in the art of formulating infant formulas will recognize how the microcapsules of the present invention can be incorporated into such infant formulas.

Example 14

Preparation of Muffins

Muffins were prepared using a commercially available muffin mix sold under the name "Betty Crocker's Wild Blueberry Muffin Mix." The muffins were prepared in accordance with package directions, except that the blueberries that are included with the commercial package were not used. Substituted for the oil called for in the recipe was the structured lipid prepared as described for use in the Examples above, with either 7.7% or 85.6% of the substituted oil being in the form of the microencapsulated lipids of Examples 5 and 12 above, having a soy or whey inner shell, respectively, and a starch outer shell. It was determined that the microcapsules of Examples 5 and 12 had an oil load of about 50%. Thus, to substitute for 4 g of structured lipid, 8 g of microencapsulated lipid was used. Similarly, to substitute for 44.5 g of structured lipid, 89 g of microencapsulated lipid was used. For each batch, the ingredients were mixed together for one minute, then apportioned at 52 g per muffin and baked at 425° F. for 16 minutes. The ingredients in each batch are set forth in Table 3.

TABLE 3

Formulation of Muffin Blends

| Control | Muffin mix | Milk 170 g | 2 eggs | Str. Lipid 52 g | No microcapsules |
|---|---|---|---|---|---|
| Ex. 14a | Muffin mix | Milk 170 g | 2 eggs | Str. Lipid 48 g | Ex. 5 (soy) 8 g |
| Ex. 14b | Muffin mix | Milk 170 g | 2 eggs | Str. Lipid 48 g | Ex. 12 (whey) 8 g |
| Ex. 14c | Muffin mix | Milk 170 g | 2 eggs | Str. Lipid 7.5 g | Ex. 15 (soy) 89 g |
| Ex. 14d | Muffin mix | Milk 170 g | 2 eggs | Str. Lipid 7.5 g | Ex. 12 (whey) 89 g |

It was observed that the batter for the control sample had a very smooth and creamy texture with high sheen. The batter for Example 14c also was creamy but did not have as high a sheen. It also had a thicker consistency than the control and some lumps. The batter for Example 14d was creamy with the same high sheen as noted for the control batter. This batter also had a few lumps but was relatively smooth. Once baked, the control muffins displayed domed tops with some splitting. The muffins of example 14c had speckled rough tops with uneven browning; their tops were slightly domed. The muffins of Example 14d had a flat top with a darker golden brown hue, and with some sheen.

The results of the baked muffins are set forth in Table 4.

TABLE 4

| Example | Color | Volume | Ht. (cm) | Wt. (g) | Sensory comments |
|---|---|---|---|---|---|
| Control | Golden brown | Most volume | 4.6 | 46.6 | Good flavor, moist, light texture, gritty, melts in mouth |
| Ex. 14a | — | — | 4.0 | 48.7 | Dry |
| Ex. 14b | Slightly darker than control | Less than control and soy | 4.0 | 48.7 | Slightly chewy, fine |
| Ex. 14c | Dark brown w/speckles | Second highest | 4.4 | 48.4 | Dry, no objectionable flavor, moist, dense, gummy, chewy |
| Ex. 14d | Darker golden brown | Least | 4.8 | 47.2 | Dry, no objectionable flavor, very bland taste, dense, chewy, bread-like, cornbread-like |

The results indicate that it is possible to substitute the microencapsulated lipids of the present invention for a significant portion of the oil in a standard baking product. It is believed that baking recipes can be optimized in terms of ingredients and baking conditions to achieved products with favorable sensory characteristics and using the microencapsulated products of the present invention.

Thus there has been disclosed a microencapsulated oil product, and a method of making such an oil product. The microencapsulated oil product of the present invention is in the form of a dry powder that can be incorporated into a variety of food items. Also disclosed are consumable products made with the microcapsules of the present invention, including foods, beverages, and mixes for making foods and beverages, and methods of making such foods, beverages, and mixes. The inventive microcapsules can be used in the beverages popularly known as sports drinks, which are water-based beverages that may contain various nutrients particularly useful to sports participants. The microcapsules can be pre-mixed into such beverages, or the microcapsules can be a component of a beverage mix which can be added to water to prepare such beverages. Similarly, the microcapsules can be part of a milk-based beverage or a mix that can be reconstituted to make a milk-based beverage. Such milk-based beverages include those based on dairy milk, or any of the products variously known as soy milk, rice milk, nut milks, and the like. The microcapsules of the present invention can be used in infant formulas, including powdered formulas, concentrated liquid formulas, and ready-to-feed formulas. The microcapsules of the present invention can be used in gravies and sauces, and in powdered mixes for such gravies and sauces. The microcapsules also can be used in baked goods and other manufactured foods such as confectionery items and snack bars.

The dry powder is free-flowing for ease of handling. The protein protects the lipid core from oxidation, and provides a nutritional benefit to the consumer. When the encapsulated oil product is a structured lipid with its own unique nutritional benefits, then the microencapsulated oil product of the invention facilitates the incorporation for those benefits in the beverages, baked goods, and other food products in which the microencapsulated oil product is used. In addition, certain phytosterols, fatty acids, amino acids, and vitamins can be included with the oil product to be encapsulated, and these nutrients thereby can be incorporated in the resulting food and beverage products. The carbohydrate outer layer can be selected to enhance the compatibility of the microcapsules in the food or beverage product. Flavors also can be incorporated into any of the core, first protein shell, or second carbohydrate shell. The high oil load and the fact that part of the encapsulating material is protein means that carbohydrate can be a relatively smaller proportion of the microcapsule, typically around 12-25%, and more preferably around 16-22%. This can minimize any adverse increase in food or beverage viscosity associated with carbohydrate microcapsules of the prior art. The use of soy protein in the inner shell can facilitate the slow release of compositions in an aqueous environment. It also can be used advantageously when a dairy-free product is desired.

Presently known preferred embodiments have been disclosed. Other modifications and equivalents to the disclosed methods and ingredients will be recognized by those skilled in the art, and are intended to be within the scope of the claims appended hereto.

What is claimed is:

1. A microencapsulated product, each microcapsule comprising
   (a) a core comprising an interesterification product of a medium chain triglyceride and a long chain triglyceride, and a phytosterol,
   (b) a first shell comprising a protein selected from the group consisting of soy proteins, whey proteins and mixtures thereof, said first shell being substantially carbohydrate-free, where the first shell forms a simple coacervate, and
   (c) a second shell comprising a carbohydrate selected from the group consisting of modified starches, polysaccharides, alginates, lactates, carrageenan, and mixtures thereof, said carbohydrate shell being substantially protein-free, said first shell being disposed between said core and said second shell, wherein the microencapsulated product is a free-flowing powder.

2. The microencapsulated product of claim 1, wherein said phytosterol is blended with said interesterification product.

3. The microencapsulated product of claim 1, wherein said phytosterol is interesterified with one or more of said medium chain triglyceride and said long chain triglyceride.

4. The microencapsulated product of claim 1, wherein said protein comprises one or more soy proteins.

5. The microencapsulated product of claim 4, wherein said one or more soy proteins is selected from the group consisting of soy protein isolate, soy protein concentrate, soy flour, and mixtures thereof.

6. The microencapsulated product of claim 1, wherein said protein comprises one or more whey proteins.

7. The microencapsulated product of claim 6, wherein said one or more whey proteins is selected from the group consisting of whey protein isolate, whey protein concentrate, and mixtures thereof.

8. The microencapsulated product of claim 1, wherein said carbohydrate comprises a modified starch.

9. The microencapsulated product of claim 1, wherein said carbohydrate comprises a polysaccharide.

10. The microencapsulated product of claim 9, wherein said carbohydrate comprises gum arabic.

11. The microencapsulated product of claim 1, wherein said core comprises at least about 20% of said microcapsule by weight.

12. The microencapsulated product of claim 11, wherein said core comprises about 20-60% of said microcapsules by weight.

13. The microencapsulated product of claim 12, wherein said core comprises about 50% of said microcapsules by weight.

14. The microencapsulated product of claim 1, wherein the second shell comprises about 12-25% of the microcapsule by weight.

15. The microencapsulated product of claim 14, wherein the second shell comprises about 16-22% of the microcapsule by weight.

16. The microencapsulated product of claim 1, wherein said protein comprises about 20-30% of the microcapsule by weight.

17. The microencapsulated product of claim 16, wherein said protein comprises about 26% of the microcapsule by weight.

18. The microencapsulated product of claim 1 having a particle size distribution of less than about 100 µm.

19. The microencapsulated product of claim 18 having a particle size distribution of about 25-75 µm.

20. A consumable product made with the microencapsulated product of claim 1.

21. The consumable product of claim 20, wherein said product is a beverage.

22. The consumable product of claim 21, wherein said beverage is a sports drink.

23. The beverage product of claim 21, wherein said beverage is a milk-based beverage.

24. The consumable product of claim 20, wherein said product is a mix for a beverage product.

25. The mix of claim 24, wherein said mix is for a sports drink.

26. The mix of claim 25, wherein said mix is for a milk-based drink.

27. The consumable product of claim 20, wherein said product is an infant formula.

28. The consumable product of claim 27, wherein said infant formula is in the form selected from the group consisting of a powdered mix, a concentrated liquid, or a ready-to-feed liquid.

29. The consumable product of claim 20, wherein said product is a baked product made with a shortening, wherein at least a portion of the shortening with which the baked product is made comprises the microcapsules of claim 1.

30. The consumable product of claim 20, wherein said product is a confectionery product.

31. The consumable product of claim 20, wherein said product is a snack bar.

32. The consumable product of claim 20, wherein said product is selected from the group consisting of gravies and sauces.

33. The consumable product of claim 20, wherein said product is a mix for the preparation of a food selected from the group consisting of gravies and sauces.

34. The microencapsulated product of claim 1, wherein the second shell forms a simple coacervate.

35. A microencapsulated product, each microcapsule comprising
(a) a core comprising an interesterification product of a medium chain triglyceride and a long chain triglyceride, and a phytosterol,
(b) a first shell comprising a protein, said first shell being substantially carbohydrate-free, where the first shell forms a simple coacervate, and
(c) a second shell comprising a carbohydrate selected from the group consisting of modified starches, polysaccharides, alginates, lactates, carrageenan, and mixtures thereof, said carbohydrate shell being substantially protein-free, said first shell being disposed between said core and said second shell, wherein the microencapsulated product is a free-flowing powder.

36. The microencapsulated product of claim 35, wherein the second shell forms a simple coacervate.

37. The microencapsulated product of claim 35, wherein said protein is selected from the group consisting of soy proteins, whey proteins, gelatins, caseins and caseinates, wheat glutens, and mixtures thereof.

* * * * *